Jan. 10, 1956 — C. FIRKINS — 2,730,072
ANIMAL HANDLING CHUTE
Filed May 19, 1953 — 2 Sheets-Sheet 2
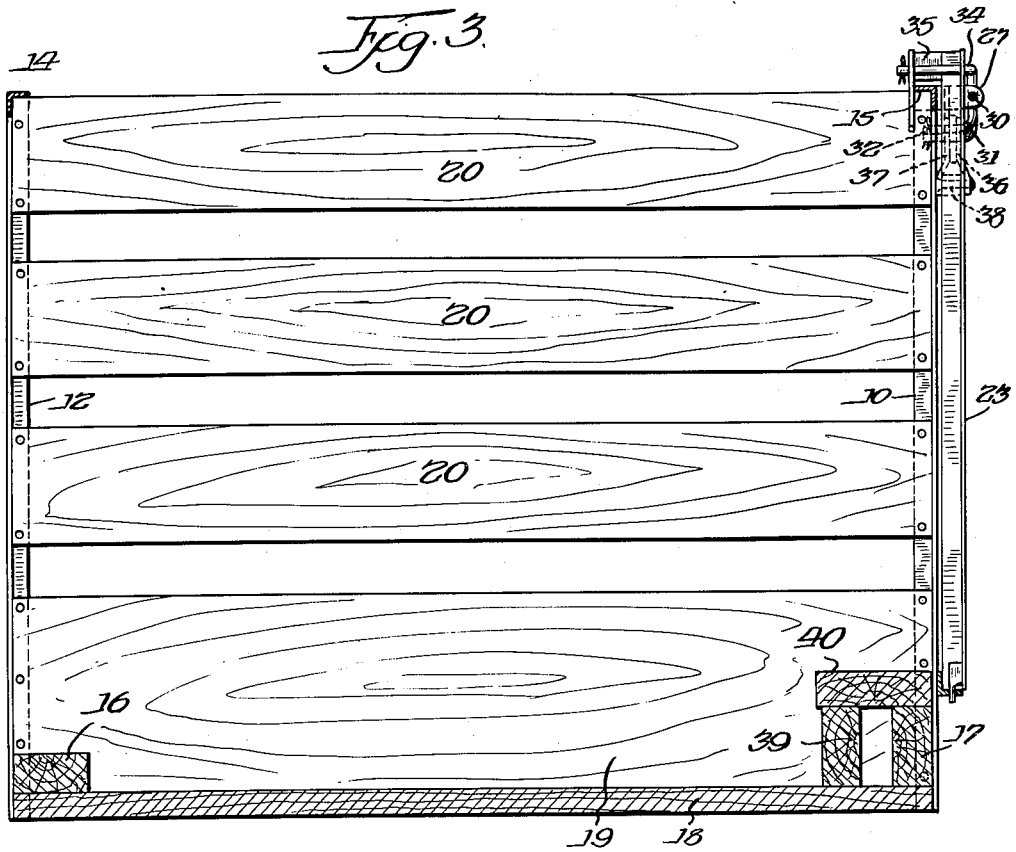
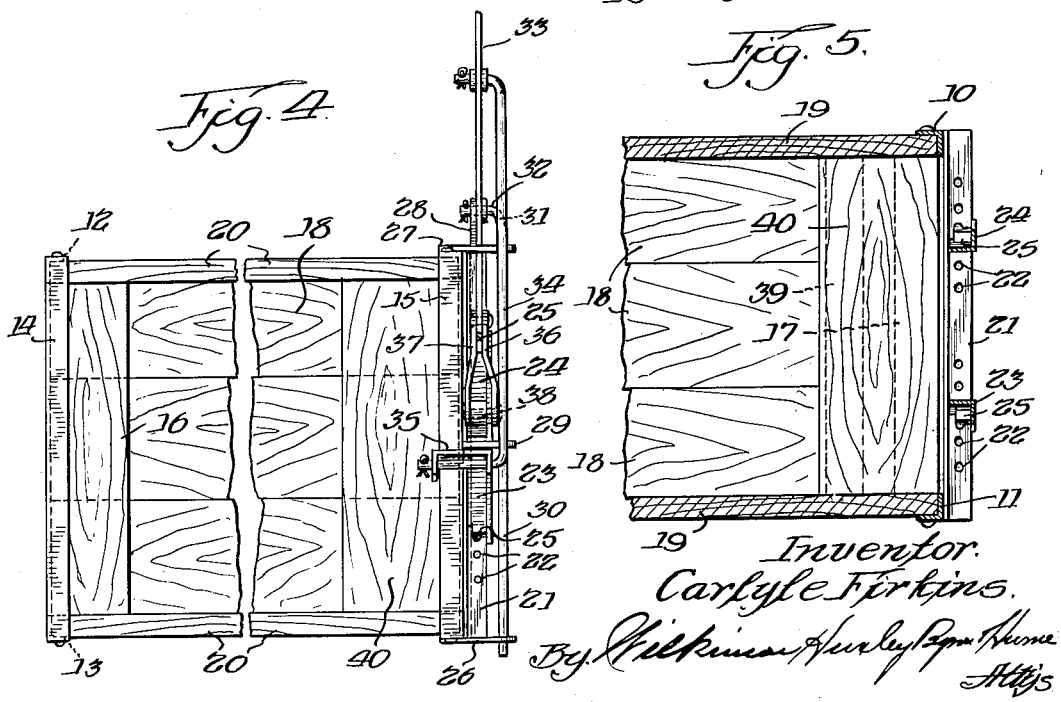
Inventor.
Carlyle Firkins.

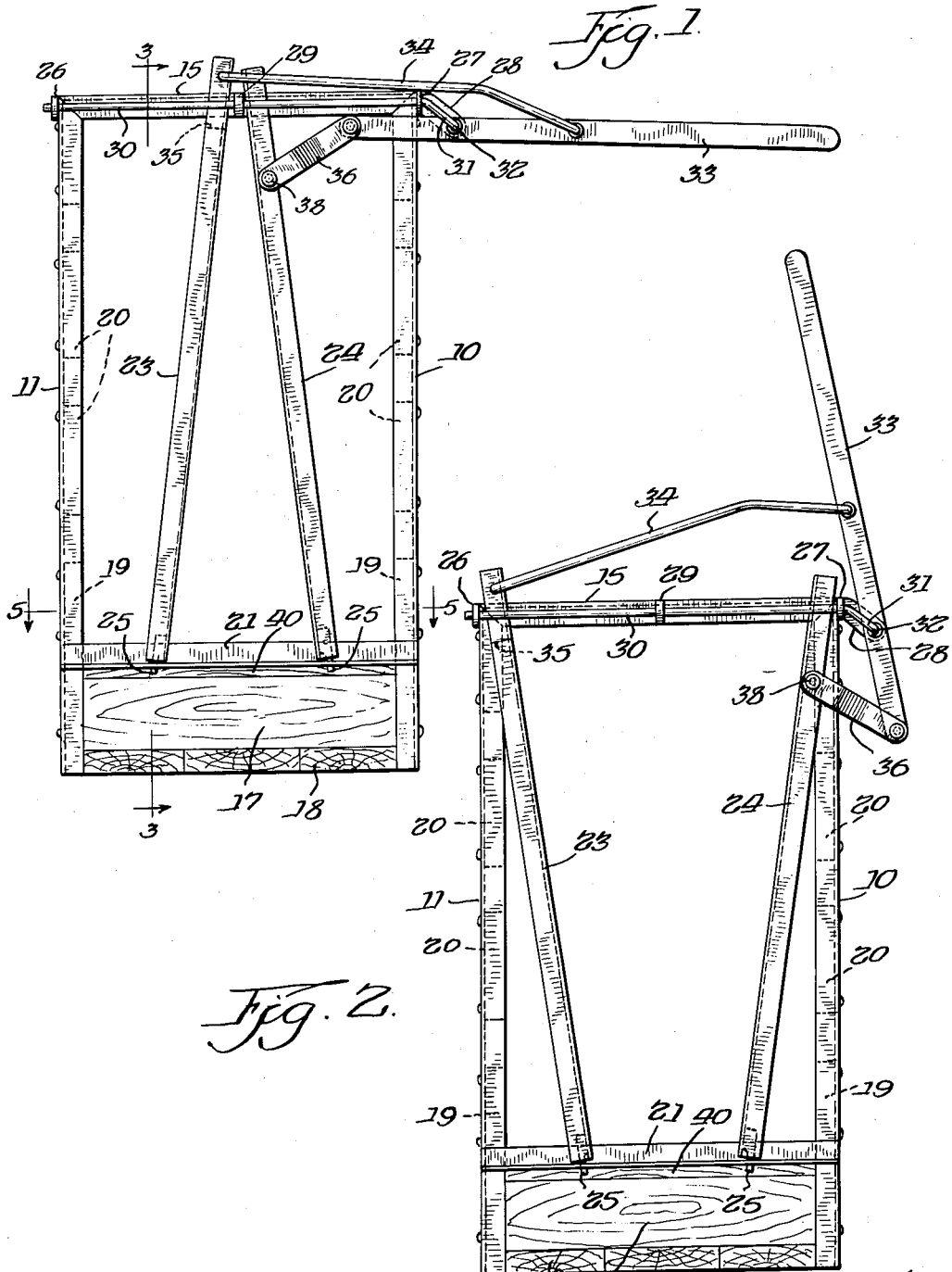

United States Patent Office 2,730,072
Patented Jan. 10, 1956

2,730,072

ANIMAL HANDLING CHUTE

Carlyle Firkins, Belvidere, Ill.

Application May 19, 1953, Serial No. 356,080

4 Claims. (Cl. 119—99)

My invention relates to a stock handling chute and has particular reference to a chute which is designed for use in the handling of hogs for the purpose of securing specimens of blood from their ears for the making of veterinary tests and for the placing of rings in the noses of hogs to prevent their rooting up ground areas, and the like, or for forceful feeding, and is arranged in such manner that the head of the hog is held substantially motionless, and also the body of the hog is retained in standing vertical position where the hog cannot brace its front legs in such manner that it can exert an appreciable amount of backward force while its head is being gripped in position in the chute.

Another object of my invention is the provision of an animal handling chute which is designed primarily to engage the animal at the sides of its head, particularly at the upper region of the neck and behind the ears, so that the breathing of the animal is not impaired and yet its head is held securely in position for such veterinary operations as may be necessary or desirable in connection with the handling particularly of hogs.

Another and further object of my invention is the provision of a hog-holding and handling apparatus in which damage or injury to the animal is unlikely to occur, and because of the particular position in which the animal is held it is not able to exert any particular struggle to resist veterinary operations or try to free itself of the apparatus, thereby injuring itself and possibly resulting in injury to the handlers as well.

Another and further object of my invention is the provision of a hog-handling apparatus in which the head-holding means is easily and quickly operated, and when in closed position is automatically locked in position against displacement, and yet can be very easily and quickly released when necessary or desirable to do so, without injury to either the animal being held in the chute or to the handlers engaged in veterinary operations in connection with the animal.

Another and further object of my invention is the provision of a chute which is particularly designed for the handling of hogs and in which adjustment in the head-holding apparatus can easily and quickly be made so that both large and small animals can be handled with a minimum of effort and security to the animal being treated and to the handlers themselves.

The invention will be further and better understood by reference to the accompanying drawings and in which—

Fig. 1 is an end elevational view of the chute and head-holding apparatus in closed position;

Fig. 2 is a view similar to Fig. 1 with the head-holding apparatus in open position;

Fig. 3 is a vertical sectional view on lines 3—3 of Fig. 1;

Fig. 4 is a top plan view of the apparatus showing the head-holding means in closed position, and Fig. 5 is a transverse sectional view on lines 5—5 of Fig. 1.

Referring now specifically to the drawings and in which like reference characters refer to like parts throughout, a chute is shown comprising four vertical corner posts 10, 11, 12 and 13 respectively, preferably made from angle iron, a top cross brace 14 welded to the upper ends of the corner posts 12 and 13, and a cross brace 15 welded or otherwise secured to the corner posts 10 and 11 at their upper ends, with a wood cross sill 16 provided at one end of the chute and secured to the corner posts 12 and 13, and a second cross sill 17, preferably of wood, extending transversely of the chute at the end opposite the sill 16 and secured to the corner posts 13 and 14, with a floor 18 being secured to the said sills 16 and 17 in any appropriate manner, this floor being solid and composed preferably of fairly heavy planks so that the hoofs of the animals will not be caught in openings between the planks, resulting in injury to the animal. Lower side panels 19, 19 are provided, preferably of wood, which are placed inside of the angles forming the corner posts, and are bolted or riveted to the corner posts, as may be desired, and are also secured to the floor boards by being nailed thereto so as to form a tight floor. If bolts are used, I prefer to use round-headed bolts which are inserted from the inside of the body of the chute outward, so that the projecting ends will not injure an animal in the chute, and other boards 20, 20 are provided which are also secured to the corner posts respectively at each of their ends, thereby forming a rectangular crate of a suitable width and height to contain the animals proposed to be treated therein, such as hogs, cattle, or the like.

At one end of the chute a cross angle 21 is provided which is welded at each of its ends to the corner posts 10 and 11 and has a plurality of holes 22, 22 therein within which a pair of vertical angle bars 23 and 24 is mounted by means of pins 25, 25 which are welded to the angles 23 and 24 respectively at their lower ends and are inserted into the holes 22, 22 and provide holding means for the vertical bars 23 and 24 against lateral displacement at their lower ends, but allow for a rocking movement of the bars 23 and 24 toward and away from each other. Brackets 26 and 27 are welded to the corner posts 10 and 11 at their upper ends, the bracket 27 having a downwardly extending projection 28 thereon for purposes hereafter described, with a second bracket 29 being welded at one of its ends to the top frame member 15, with a rod 30 being mounted in the said brackets 26, 27 and 28, the rod 30 having a downwardly turned end portion 31 and a right-angled end portion 32 which extends through the extension 28 of the bracket 27 and forms a pivotal support for a lever 33, which has a rod 34 connected thereto at a point spaced from the pivotal point 32 of the lever 33—the rod 34 at its opposite end being connected to the upper end of the bar 23 and to a movable guide member 35 which extends across the top of and downward alongside the inner side of the cross brace 15, thereby forming a guideway for the rocking movement of the vertical bar 23.

The end of the lever 33 below its mounting point 32 has a pair of links 36 and 37 connected thereto which extend inwardly therefrom and are connected to the vertical bar 24 by means of a bolt or rivet 38 at a point on the bar 24 spaced from the upper free end of the bar 24, for purposes hereinafter described in connection with the operation of the device.

A member 39 extends transversely of the bottom of the chute in spaced relation with the cross sill 17, and has a top member 40 secured thereto which is also secured to the cross sill 17—the upper surface of the top member 40 being approximately 5" above the floor 16 of the chute, with the rear edge of the members 39 and 40 being spaced a short distance from the front end of the chute, so that an animal being positioned in the chute and having the bars 23 and 24 in engagement with the sides of its neck approximately just back of its ears will place the animal in such position that its legs extend in a vertical direction, the member 40 and its base members 17 and 39 being about 6" in height and approximately the same width, this vertical member being of such a height that the animal ordinarily would not step on top of it. The bars 23 and 24 are adjustably positioned and spaced from each other in the cross bar 21 to conform generally to the size of the animal's neck at the point where it will be engaged by the bars 23 and 24 and as these bars 23 and 24 are moved towards each other they engage the sides of the neck of the animal and grip tightly the upper part or muscular part of the neck without applying any pressure on the animal's throat which might interfere with the animal's breathing. The bars 23 and 24 are straight and always, when in closed position, form a triangle with the bar 21 as the base of the triangle with the animal's throat adjacent the base or widest part of the triangular space defined by the said bars 23 and 24 so that danger of injury to the animal by any interference with its breathing is always avoided. Therefore, the animal is held in position in the chute in such manner that its fore legs are vertical with respect to its body and not at an angle which represents the position of the legs of an animal when making a backward pull with its body and, therefore, holds the animal in such position that it cannot exert a great deal of force in a backward direction in trying to pull its head from engagement with the bars 23 and 24 while being held by these bars.

In operation the device is exceedingly simple in that an animal upon being placed in the chute is moved into position with his head first entering the chute, at the open end thereof, and moved forward until its head projects out of the chute between the bars 23 and 24, which have been previously adjusted in the proper openings 22, 25 to accommodate an animal of a particular thickness of neck, and upon the animal being brought into this position, the operator turns the lever from its position shown in Fig. 2 in a clockwise direction, whereupon the bar 23 is moved towards the center line of the chute while the bar 24 is also moved in an opposite direction towards the center of the chute due to the thrust exerted upon the bar 24 upon the lever 33 through the links 36 and 37 until the lever 33 is in a substantially horizontal position (Fig. 1), in which position the centers of the connecting points of the rod 34 to the lever 33 and the pivotal point of connection of the links 36 and 37, with the pivotal point of the lever 33 are in alignment with the links 36 and 37 extending upwardly and transmitting outward force on the vertical bar 24 into an upward direction on the lever 33 while the rod 34 is brought down into engagement with the outer end of the bracket 27, which forms a stop against further movement of the lever 33 in a clockwise direction, so that the lever is held in automatically locked position without attention on the part of the operator, and the operator is free to assist in ringing a hog or extracting blood from the hog's ears for the purpose of making blood tests and the like. The animal's head being held firmly in position, and standing in a vertical position, it will not attempt to make violent struggles to release itself and, therefore, usually remains quiet while the blood-taking operation, ringing, or forceful feeding or medication internally of the hog or animal is performed by a veterinarian or the operator, if desired. Upon completing whatever operation is needed upon the animal, an operator grasping the lever 33 and moving its outer end upward in a counter-clockwise direction (Fig. 1) the bar 23 is thrust towards the outer side of the chute and the inner end of the lever 33, moving downward, passes beyond the dead center position with respect to its centers of attachment to the bar 24, thereby releasing the grip on the bars 23 and 24 on the animal's head, and it is thereupon released from the chute.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

What is claimed is:

1. An animal handling chute consisting of a rectangular member having open ends and a closed bottom and sides, a pair of holding bars at one end of the said chute, a transverse member upon which the lower ends of the said holding bars are mounted, a transversely extending guide rod having a downwardly turned portion at one of its ends forming an outside guide member for the vertical holding members, brackets on the said chute within which the said guide rod is mounted, a lever pivotally mounted intermediate its ends on the said transversely extending guide rod, a connecting rod secured to one of said holding members at one of its ends and to the said lever at its opposite end, one of said brackets within which the guide member is mounted forming a stop against the downward movement of the said connecting lever and a link secured to the said lever at its lower end and to the other of said holding bars at a point spaced from its upper end, the said link and the connecting rod forming toggle connections with the holding members and the said lever, the force of the said link being normally exerted in a direction opposite to that of the connecting rod, but when turned beyond aligned position of the pivotal point of the lever and attachment point of the connecting rod and the lever to exert its force in the opposite direction whereby the lever is held in locked position against the said stop, the said bars being straight and disposed at an angle to each other when in closed position in substantial meeting engagement with the upper ends thereof and spaced a substantial distance at their lower ends when in closed position whereby pressure is exerted only upon the upper portions of the neck of the animal while in the chute.

2. An animal handling chute comprising a rectangular container open at its ends and closed at its sides and bottom, a pair of vertical holding members at one end of the said chute rockingly mounted at their lower ends, guides for said holding members at the top of the said chute, an operating lever for the said holding members, toggle connections between the said lever and the said holding members and a cross member at least four inches in height and width at the bottom of the said chute extending above the floor with its rear side in spaced relation to the said holding members whereby an animal engaged by the holding members is prevented from bracing its fore legs against the said cross member.

3. An animal handling chute comprising a rectangular container open at its ends and closed at its sides and bottom, a pair of vertical holding members at one end of the said chute rockingly mounted at their lower ends, guides for said holding members at the top of the said chute, an operating lever for the said holding members, toggle connections between the said lever and the said holding members and a cross member approximately four inches in height and width at the bottom of the said chute extending above the floor with its rear side in spaced relation to the said holding members, the said cross member forming a support for the animal's head and preventing the said animal from bracing its body to exert a pull on the said holding members.

4. An animal handling chute comprising a rectangular container open at its ends and closed at its sides and bottom, a pair of vertical holding members at one end of the said chute rockingly mounted at their lower ends, guides for said holding members at the top of the said chute, an operating lever for the said holding members, toggle connections between the said lever and the said holding members and a cross member of substantial height and width at the bottom of the said chute extending transversely inside the chute above the floor level, with its rear side in spaced rearward relation to the said holding members whereby an animal engaged by the holding members is caused to stand in an erect position in the said chute.

References Cited in the file of this patent

UNITED STATES PATENTS

| | | |
|---|---|---|
| 305,609 | Lower | Sept. 23, 1884 |
| 658,128 | Smith | Sept. 18, 1900 |
| 1,227,712 | Watson | May 29, 1917 |
| 1,360,940 | Hanson | Nov. 30, 1920 |
| 1,360,941 | Hanson | Nov. 30, 1920 |
| 2,113,741 | Peterson | Apr. 12, 1938 |
| 2,268,707 | Huckelbridge | Jan. 6, 1942 |